United States Patent [19]
Murdock

[11] Patent Number: 6,062,627
[45] Date of Patent: May 16, 2000

[54] NO-TABBING VISOR MOUNTING PIN

[75] Inventor: Jay A. Murdock, Southgate, Mich.

[73] Assignee: Lear Automotive Dearborn, Inc., Southfield, Mich.

[21] Appl. No.: 09/098,866

[22] Filed: Jun. 17, 1998

[51] Int. Cl.$^7$ ..................................................... B60J 3/02
[52] U.S. Cl. .......................................... 296/97.9; 296/97.1
[58] Field of Search .................................. 296/97.1, 97.9

[56] References Cited

U.S. PATENT DOCUMENTS

| | | |
|---|---|---|
| 4,458,938 | 7/1984 | Viertel et al. . |
| 4,773,698 | 9/1988 | Svensson ................................. 296/97.9 |
| 4,944,549 | 7/1990 | Hilbert et al. . |
| 5,374,097 | 12/1994 | George et al. ...................... 296/97.9 X |
| 5,538,311 | 7/1996 | Fusco et al. ........................ 296/97.9 X |
| 5,716,092 | 2/1998 | Dellinger et al. . |
| 5,816,642 | 10/1998 | Wilson ................................... 296/97.9 |
| 5,887,933 | 3/1999 | Peterson ................................ 296/97.1 |

Primary Examiner—Joseph D. Pape
Attorney, Agent, or Firm—MacMillan, Sobanski & Todd, LLC

[57] ABSTRACT

A visor mounting pin that pulls the covering cloth inside the substrate halves during the same operation as pin insertion thereby eliminating the entire secondary tabbing operation and the use of an adhesive. The visor mounting pin includes a plurality of fasteners hidden from view when installed in a visor. A first fastener retains the visor mounting pin to the vehicle interior, a second fastener affixes covering material to the visor substrate by tension, and a third fastener attaches the visor mounting pin to the visor substrate. Preferably, the first, second, and third fasteners are integrally molded as one complete piece.

16 Claims, 3 Drawing Sheets

NO-TABBING VISOR MOUNTING PIN

BACKGROUND OF THE INVENTION

The present invention relates to an automotive visor, and more particularly to a visor mounting pin which affixes a covering material to a visor substrate proximate to the visor pin opening during the operation of inserting the pin.

Automotive visor construction commonly consists of laminating a covering material over a substantially rigid substrate. It is normally desirable to cover the substrate with an aesthetically pleasing material such as a cloth or leather. The substrate is normally a precut butterfly-shaped panel having identical halves and a central folding area. The butterfly-shaped panel substrate is upholstered with covering material and folded over upon itself to complete a visor body.

An area of concern in the application of the covering material are openings which pass through the substrate, such as visor mounting pin openings. The visor mounting pin openings provide attachment locations for visor mounting pins which mount the visor to the vehicle interior. These openings require that the covering material be cut and then bonded inside the substrate to provide an acceptable finish in the area proximate to the visor mounting pin. The operation is referred to as tabbing and normally requires at least a two stage operation and the use of an adhesive. Typically, the covering material is cut into a star-like pattern in a location corresponding to the visor mounting pin opening to create a plurality of tabs. In a secondary operation the tabs created by the cutting operation are pulled through the visor mounting pin opening and into the area between the substrate halves and bonded to provide the finished visor mounting pin opening. However, these operations normally require a long cycle time and the use of an adhesive.

SUMMARY OF THE INVENTION

The present invention provides a visor mounting pin that pulls the covering material inside the substrate halves during the same operation as pin insertion thereby eliminating the entire secondary tabbing operation and the use of an adhesive.

A visor mounting pin is provided having a plurality of fasteners hidden from view when installed in a visor. A first fastener retains the visor mounting pin to the vehicle interior, a second fastener affixes covering material to the visor substrate by tension, and a third fastener attaches the visor mounting pin to the visor substrate. Preferably, the first, second, and third fasteners are integrally molded as one complete visor mounting pin piece.

The visor mounting pin is inserted into the visor assembly through an opening in the substrate. Preferably, a plurality of slits in the covering material allows the first fastener to pass through the covering material and the second fastener to pull the covering material between the substrate halves. As the pin is inserted, the second fastener places the covering material under tension and pressure tabs press the covering material against the inner halves of the substrate. When the pin is fully inserted, attachment shoulders rest on the inner surface of the substrate adjacent to the pin opening and third fastener attachment pins are located in substrate attachment holes to maintain the covering material under tension. The present invention therefor eliminates the secondary operation of independently pulling the covering material tabs into the visor and bonding them to the substrate.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
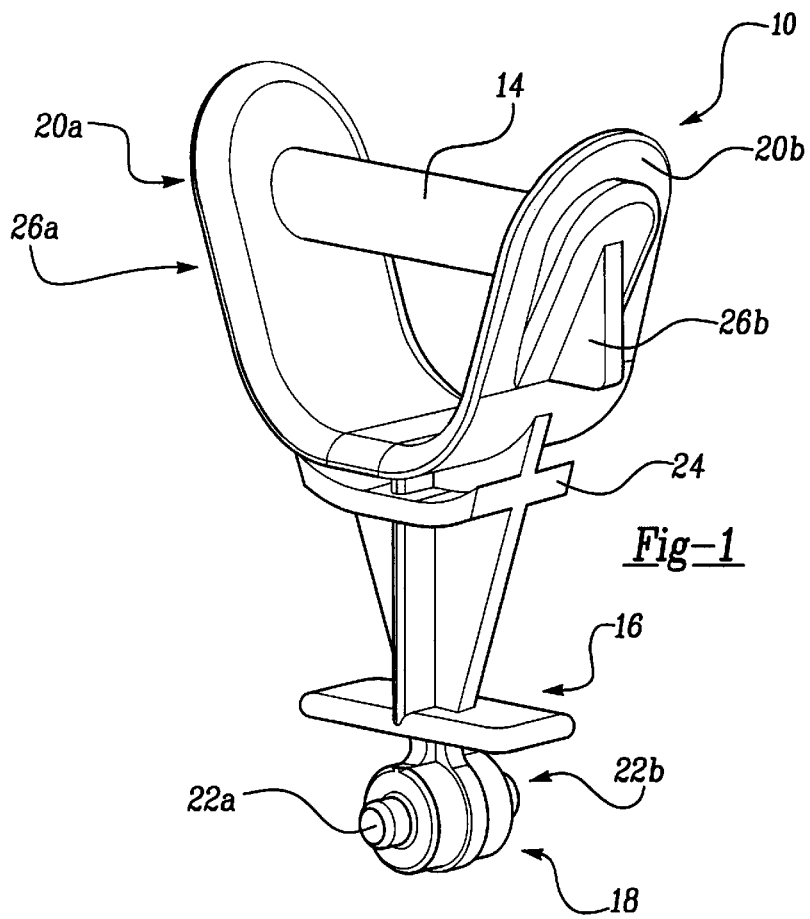
FIG. 1 is a detailed perspective view of a visor mounting pin of the present invention.

A visor mounting pin 10 is shown in FIG. 1. As will be further described below the visor mounting pin 10 generally includes a first fastener 14, a second fastener 16, and a third fastener 18 located along a longitudinal axis and the visor mounting pin 10 is preferably molded as a one piece unit.

Figure 2:
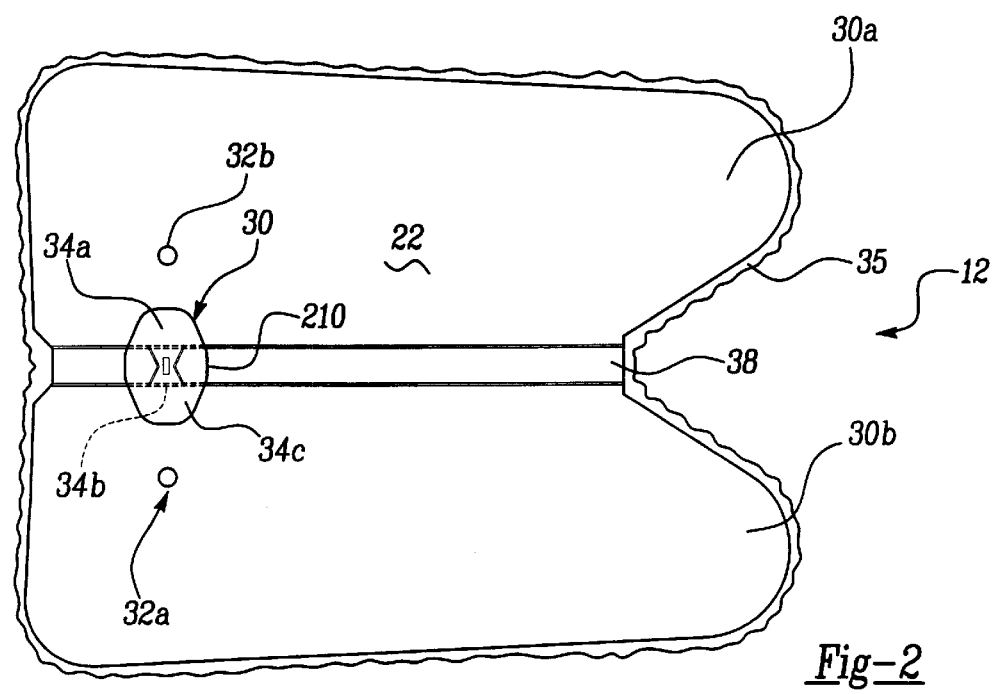
FIG. 2 is an plan view of the butterfly-shaped substrate panel including a covering material.

FIG. 1 provides a detailed perspective view of the visor mounting pin 10 of the present invention. The first fastener 14 is preferably a rod-like member supported between a first shoulder 20A and a second shoulder 20B. When the visor mounting pin 10 is installed, the shoulders 20A–B mount flush with corresponding opening 30 (FIG. 3) in the visor and preferably have an aesthetically acceptable finish on the visible surface. The shoulders 20A–B further provide a first and second pressure tab 26A–B which exert pressure on the covering material 35 (FIG. 3) proximate to shoulders 20A–B. When installed, the first fastener 14 extends along an upper edge of the visor 12 (FIG. 4). The second fastener 16 is a bar-like member extending substantially parallel to the first fastener 14. The second fastener 16 exerts tension on the covering material 35 proximate to the visor mounting pin 10. A third fastener 18 is located adjacent to the second fastener 16 and includes at least one pair of opposed attachment pins 22A–B for insertion into mounting pin holes 32A–B (FIG. 2). A support member 24 is preferably located between the first fastener 14 and the second fastener 16 to maintain the shape of visor opening 30 (FIG. 4).

As shown in FIG. 2 the visor 12 consists of a rigid substrate 22 and the outer covering material 35. The covering material 35 is edge-rapped or bonded to the substrate 22 by methods commonly known in the art. The covering material is normally an aesthetically pleasing material such as a cloth-like textile or leather, while the substrate 22 is a substantially rigid material such as cardboard or polypropylene. Prior to being folded into final form the substrate 22 is a butterfly-shaped panel having a first half 36A and a second half 36B connected by a central folding area 38. The substrate 22 includes an opening 30 and attachment locator pin holes 32A–B for the non-adhesive attachment of visor mounting pin 10 (FIG. 1).

Figure 3:
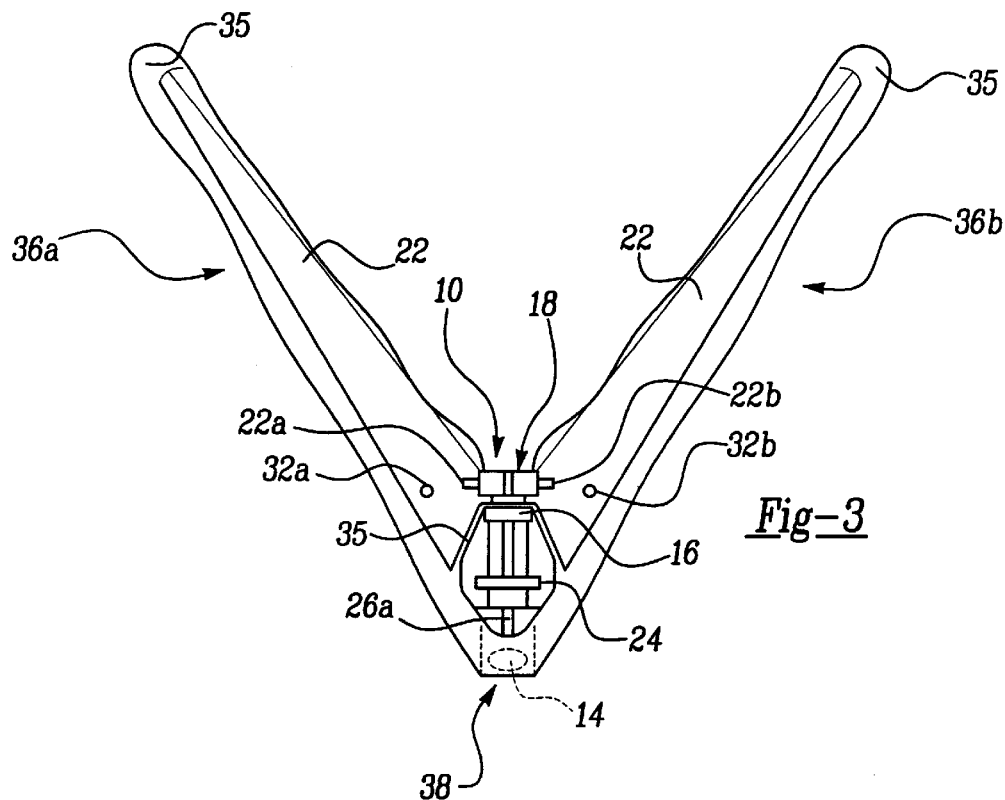
FIG. 3 is a side view of a visor showing the installed position of the visor mounting pin of the present invention prior to the butterfly-shaped substrate halves being sealed together.
Figure 4:
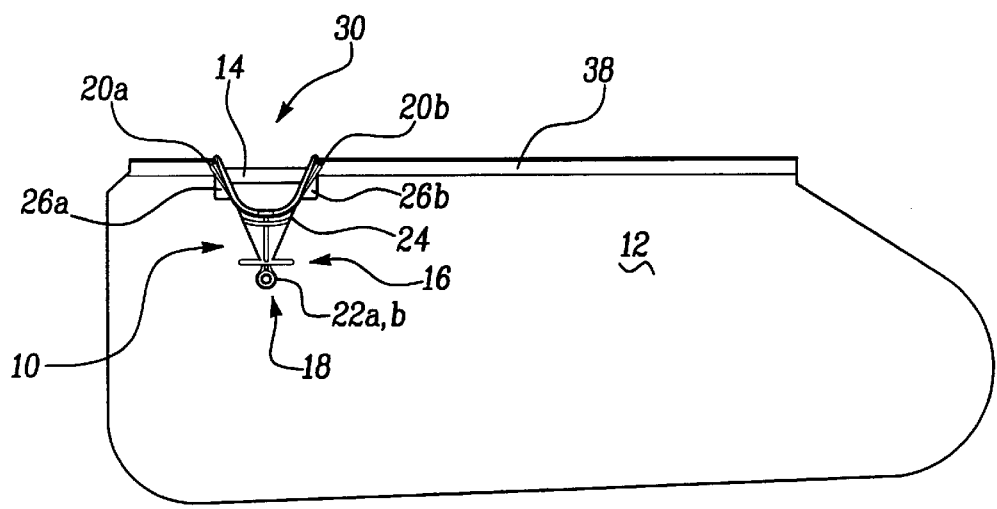
FIG. 4 is a cross-sectional view of a visor showing the installed position of the visor mounting pin of the present invention.

FIG. 3 shows a side view of a visor 12 illustrating the installed position of the visor mounting pin 10 of the present invention prior to the butterfly-shaped substrate halves 36A, 36B being sealed together. A plurality of slits 34A–C (FIG. 2) are located in covering material 35 corresponding to opening 30. Preferably, the slits 34A–C are generally parallel and slits 34A, 34C are bent toward each other proximate to their midpoint. As the visor mounting pin 10 is inserted in visor 20 through opening 30 the third fastener 18 passes through slit 34B. The second fastener 16 exerts tension on each side of slit 34B by pulling the covering material 35 between the first and second slit 34A, 34B and the second and third slits 34B, 34C between substrate halves 36A, 36B. In other words, the covering material 35 is stretched between opening 30 and second fastener 16. Additionally, pressure tabs 26A, 26B exert pressure on covering material 20 proximate to the first and third slits 34A, 34C by pressing the covering material 20 to the sides of opening 30 along fold area 38. When the pin is fully inserted, the attachment shoulders 20A, 20B and pressure tabs 26A, 26B rest under the inner surface of substrate 22 adjacent to opening 30. The support member 24 presses against the inner surface of the substrate halves 36A, 36B, and attachment pins 22A, 22B are located in attachment holes 32A, 32B. FIG. 4 shows a cross-sectional view of the visor mounting pin 10 installed in an automotive visor 12. Opening 30 is formed through the substrate 22, but opening 30 is covered by covering material 20. FIG. 4 illustrates the visor 12 in final form, that is after the first and the second half 36A, 36B of the butterfly-shaped substrate has been folded in half along folding area 38 and sealed. The first fastener 14 provides a mounting point allowing the visor 12 to be retained by a securing clip (not shown) commonly located along the top of a vehicle windshield (not shown). The visor mounting pin 10 is installed into opening 30 within the visor 12 after covering material 35 is laminated to substrate 22. The visor mounting pin 10 is inserted into opening 30 such that the second fastener 16 pulls the covering material 35 through opening 30. The visor mounting pin 10 is then attached to the substrate 22 by inserting locating pins 22A–B into locator pin holes 32A–B and shoulders 20A–B into opening 30. Once attached to substrate 22, the second fastener 16 maintains covering material 35 in tension thereby providing an acceptable finish to the covering material 35 in the area proximate to visor mounting pin 10.

Figure 5:
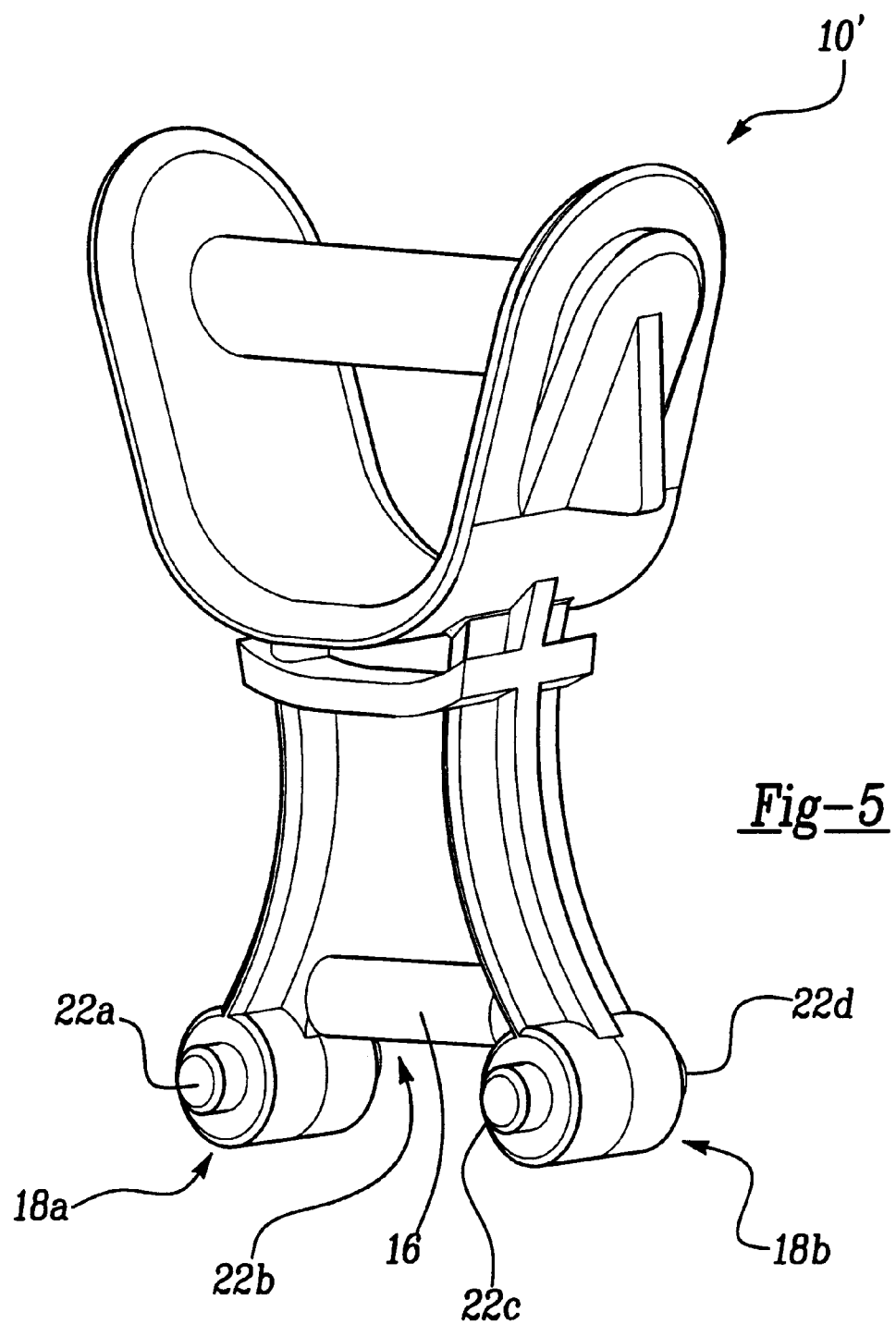
FIG. 5 is an alternate embodiment of a visor mounting pin shown in FIG. 1.

In an alternate embodiment of the present invention, the center slit 34B (FIG. 2) is eliminated by the visor mounting pin 10' shown in FIG. 5. In this embodiment, the third fastener 18A–B is bridged by the second fastener 16. Each portion of the third fastener 18A–B having at least two opposed locating pins 22A–D. As the visor mounting pin 10' is inserted in visor 20 through opening 30 the third fastener 18A–B passes through slit 34A and slit 34B. The second fastener 16 exerts tension between slits 34A, 34C by pulling the covering material 20 between slits 34A, 34C through opening 30 and between substrate halves 36A, 36B.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A visor mounting pin for a visor including a substantially rigid substrate and an outer covering material, said visor mounting pin comprising:

a first fastener supported between a first shoulder and a second shoulder; and a second fastener extending substantially parallel to said first fastener, wherein the outer covering material of said visor is stretched between an opening of the substrate and said second fastener when said visor mounting pin is inserted into the opening in the substrate.

2. The visor mounting pin according to claim 1, further comprising a third fastener extending substantially perpendicular to said first and second fasteners, said third fastener including at least one pair of opposed attachment pins for inserting into a pair of mounting pin holes in the substrate.

3. The visor mounting pin according to claim 1, further comprising a first pressure tab proximate to said first shoulder, and a second pressure tab proximate to said second shoulder, said first and second pressure tabs exerting pressure on the covering material proximate to said first and second shoulders when said visor mounting pin is inserted into the opening of the substrate.

4. The visor mounting pin according to claim 1, further comprising a support member located between the first fastener and said second fastener for maintaining a shape of the opening of the substrate.

5. A visor assembly, comprising:

a substantially rigid substrate having a first half and a second half connected by a central folding area, the central folding area including an opening;

an outer covering material; and a visor mounting pin including a first fastener supported between a first shoulder and a second shoulder, and a second fastener extending substantially parallel to said first fastener, wherein said outer covering material is stretched between the opening in the central folding area of said substrate and said second fastener of said visor mounting pin when said visor mounting pin is inserted into the opening in the central folding area of said substrate.

6. The visor assembly according to claim 5, wherein said visor mounting pin further comprises a third fastener extending substantially perpendicular to said first and second fasteners.

7. The visor assembly according to claim 6, wherein said first half of said substrate includes a first mounting pin hole, and wherein said second half of said substrate includes a second mounting pin hole, and wherein said third fastener includes at least one pair of opposed attachment pins for inserting into the first and second mounting pin holes.

8. The visor assembly according to claim 5, wherein said visor mounting pin further comprises a first pressure tab proximate to said first shoulder, and a second pressure tab proximate to said second shoulder, said first and second pressure tabs exerting pressure on the covering material proximate to said first and second shoulders when said visor mounting pin is inserted into the opening in the central folding area of said substrate.

9. The visor assembly according to claim 5, wherein said visor mounting pin further comprises a support member located between the first fastener and said second fastener for maintaining a shape of the opening in the central folding area of said substrate.

10. The visor assembly according to claim 5, further comprising a plurality of slits in the central folding area of said substrate, the covering material being pulled between at least two slits of the plurality of slits when said visor mounting pin is inserted into the opening in the central folding area of said substrate.

11. A method of installing a visor mounting pin to a visor assembly, comprising the steps of:

a) folding a substrate in half along a central folding area, the central folding area including an opening;

b) sealing the substrate;

c) attaching an outer covering material to the substrate, the outer covering material including a plurality of slits corresponding to the opening in the central folding area of the substrate;

d) inserting a visor mounting pin through the opening in the central folding area of the substrate, the visor mounting pin including a first fastener, a second fastener, and a third fastener with a pair of locating pins, the second fastener of the visor mounting pin pulling a portion of the outer covering material through the opening; and e) attaching the visor mounting pin to the substrate by inserting the locating pins of the third fastener into corresponding locator pin holes in the substrate, whereby the second fastener of the visor mounting pin maintains the covering material in tension, thereby providing an acceptable finish to the covering material in an area proximate to the visor mounting pin.

12. The method according to claim 11, wherein the second fastener exerts tension on each side of at least one slit of the plurality of slits by pulling the covering material between at least two other slits of the plurality of slits, thereby maintaining the covering material in tension.

13. A visor mounting pin for a visor including a substantially rigid substrate and an outer covering material, said visor mounting pin comprising:

a first fastener supported between a first shoulder and a second shoulder;

a second fastener extending substantially parallel to said first fastener; and a third fastener bridged by said second fastener and extending substantially perpendicular to said first and second fasteners.

14. The visor mounting pin according to claim 13, wherein said third fastener includes at least one pair of opposed attachment pins for inserting into a pair of mounting pin holes in the substrate of said visor.

15. The visor mounting pin according to claim 13, further comprising a first pressure tab proximate to said first shoulder, and a second pressure tab proximate to said second shoulder, said first and second pressure tabs exerting pressure on the covering material proximate to said first and second shoulders when said visor mounting pin is inserted into an opening in the substrate of said visor.

16. The visor mounting pin according to claim 13, further comprising a support member located between the first fastener and said second fastener for maintaining a shape of an opening in the substrate of said visor.

* * * * *